Dec. 28, 1926.
C. W. CAMPBELL
1,611,884
TIRE CASING VULCANIZER
Filed June 13, 1925
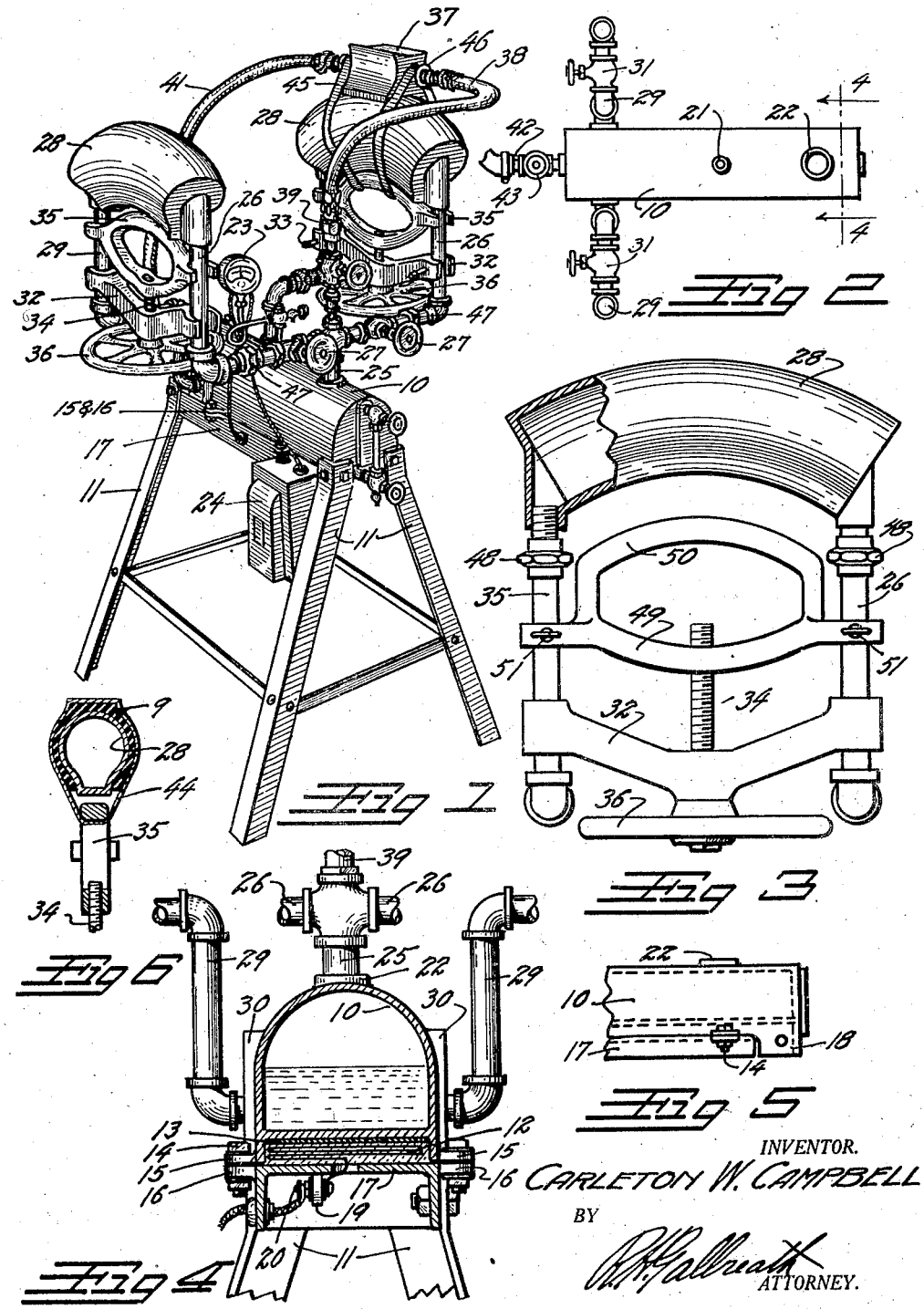
INVENTOR.
CARLETON W. CAMPBELL
BY
ATTORNEY.

Patented Dec. 28, 1926.

1,611,884

UNITED STATES PATENT OFFICE.

CARLETON W. CAMPBELL, OF DENVER, COLORADO, ASSIGNOR TO MOLL MANUFACTURING COMPANY, OF DENVER, COLORADO.

TIRE-CASING VULCANIZER.

Application filed June 13, 1925. Serial No. 36,932.

This invention relates to a device for curing or vulcanizing repairs on pneumatic tire casings, more particularly of the type designed for applying the heat on the interior of the casing.

The principal object of the invention is to combine in a compact and efficient apparatus, curing arms, clamping means, steam boiler, heating element and all apparatus necessary for use in the vulcanizing process.

Another object of the invention is to so construct the curing arms that they will have the necessary mechanical strength and yet will have a low specific heat and high thermal value.

Still another object of the invention is to provide an attachment which can be used for simultaneous external curing which may be supplied with a constant current of live steam when desired.

A further object is to so arrange the curing arms that they may be quickly and easily removed and interchanged without disturbing the clamping means.

A still further object is to efficiently combine an electrical heating element with a steam boiler in a device of this character so as to obtain an even distribution of heat over the boiler surface and so that the heating element will be protected from mechanical and electrical injury.

Other objects and advantages reside in the detail construction of the invention, which result in simplicity, economy, and efficiency, and which will become more apparent from the following description.

In the following detailed description of the invention reference is had to the accompanying drawing which forms a part hereof. Like numerals refer to like parts in all views of the drawing and throughout the description.

In the drawing:—

Fig. 1 is a perspective view of my complete device.

Fig. 2 is a plan view of the boiler employed in my vulcanizer, showing the steam return fittings partially assembled thereon.

Fig. 3 is a detail view of a curing arm and clamp assembly which may be used on the device.

Fig. 4 is a cross section through the boiler, taken on the line 4—4, Fig. 2.

Fig. 5 is a detail side elevation of the boiler.

Fig. 6 is a detail view, illustrating the method of clamping a tire casing to the curing arm of the machine.

The invention comprises a cast steel boiler 10, supported on suitable legs 11. The sides and ends of the boiler project downward below the bottom thereof, as shown in Fig. 2, and form a housing for electrical heating elements, illustrated at 12.

A copper plate, 13, is placed between the boiler bottom and the heating elements 12. This copper serves, not only to protect the element from being damaged by the rough cast surface of the boiler but, being an excellent heat conductor, it acts to more evenly distribute the heat from the elements over the entire boiler bottom.

A flanged bottom plate 17 is secured over the boiler bottom by means of bolts 14 which pass through lugs 15 formed on the boiler and lugs 16 formed on the bottom plate 17. As the bolts 14 are drawn up, the plate 17 will firmly clamp the heating elements 12, against the copper plate 13, and the copper plate firmly against the boiler bottom.

The bottom plate 17 does not extend the entire length of the boiler and beyond its extremities the boiler sides are projected downward, as illustrated at 18 in Fig. 5, to form flanges for the attachment of the legs 11. Lugs 19 are projected downward for the support of binding posts 20 to which the terminal wires of the heating elements 12 are attached.

Formed on the top of the boiler, are two bosses 21 and 22, threaded for pipe connections. From the smaller boss 21 a trapped pipe leads to an electrical-control pressure gauge 23. This gauge acts to cut off the current supply to the heating elements 12 when the pressure in the boiler has reached a predetermined amount, and is placed in series between the heating elements and a main cut off switch 24.

In the larger boss, 22, a steam supply riser 25 is threaded.

From the supply riser 25, two oppositely extending feed pipes 26 extend, controlled by valves 27. The feed pipes 26 extend outwardly and upwardly, terminating in inside curing arms 28.

The steam returns from the curing arms 28 through return pipes 29, which return to bosses 30 on opposite sides of the boiler and enter the boiler below the water line thereof. The return pipes 29 are controlled by means of suitable valves 31.

A yoke 32 is placed between each pair of feed and return pipes 26 and 29. The extremities of the yokes 32 are notched to fit around the said pipes and are locked in any desired position thereon by means of set screws 33.

A clamp screw 34 is arranged to pass through an opening in the yoke 32 and is threaded into a slidably mounted saddle bar 35, the extremities of which, are also notched to fit around the pipes 26 and 29, upon which they are movable. The clamp screws 34 are actuated by means of hand wheels 36.

For applying heat to the outside of a casing a spot plate 37 is provided which is supplied with steam through a flexible feed hose 38 which connects to a hose pipe 39 which in turn connects with the supply riser 25. The hose pipe 39 carries a valve 40, by means of which, the steam supply to the spot plate 37 is controlled. Steam returns from the spot plate 37 through a similar, flexible, return hose 41, connecting with a return hose pipe 42, which enters the boiler below the water line thereof and which is controlled by means of a valve 43.

In use, a tire casing is placed over one of the curing arms 28, as illustrated in Fig. 6. Tape 44 is passed around the casing and around the upper bar of the saddle bar 35. If it is desired to use the spot plate 37 for a simultaneous outside cure, it is placed over the repaired spot on the exterior of the casing and is tied in place by means of straps 45. The straps 45 are passed over spools 46 formed on each extremity of the spot plate, and around the casing, under the upper bar of the saddle bar 29. The hand wheel 36 is now actuated so as to thread the clamp screw 34 into the saddle bar 29. This draws downward upon the tape 44 and the straps 45 and firmly clamps the casing to the curing arm 28 and the spot plate 37 to the casing. The heat from the curing arm and spot plate effectively vulcanize the repair in the casing. A pressure of several hundred pounds may be put upon the casing in this manner.

With the construction of Fig. 1, the entire assembly of curing arm 28, saddle bar 29 and yoke 32 must be removed when it is desired to insert a curing arm of differing size, because of the location of the attachment unions 47 in the pipe lines. This may be obviated by the construction illustrated in Fig. 3, in which unions 48 are placed in the feed and return pipes 26 and 35 immediately adjacent the curing arm 28. A special saddle bar 49 must be used, however, the upper bar of which, 50, is projected upward so that it will pass the unions 48 and come into contact with the curing arm 28. With this construction, it is only necessary to unfasten the unions 48 and remove and replace the curing arm, without disturbing the clamping mechanism. The valves 27 and 31 are, of course, closed before the removing operation.

I prefer to use thumb screws 51, for temporarily securing the saddle bars 35 or 49 in place on the pipes, while the tape 44 is being wrapped.

The curing arms 28 and their supporting structure are subjected to considerable strain in placing or removing a casing and for this reason have hitherto been formed of iron or steel. These metals, however, have such a high specific heat value that with their use the entire value of the applicant's device would be lost. The boiler 10 is of comparatively small size so as to be easily portable and economical for electrical heating. Were the arms formed of the customary iron, and the steam turned therein it would immediately be condensed and returned as cold water to the boiler. This would necessitate it being again brought to the steaming point and, in the meantime, the arm would again chill so that the operation would be repeated.

I have found that by forming the supporting structure of iron or steel and the arm of a metal having a low specific heat, such as aluminum or copper, that I have the ideal combination. I prefer to employ aluminum and with its use, the arm heats almost immediately and yet, with the iron supporting structure, I have the necessary mechanical strength. The aluminum is light and easily handled, is practically non-corrosive and will take a high mirror-like polish.

The unusual design of the boiler allows a flat heating element to be placed against it and yet, by its curved sides and top, takes advantage of the strength of the arch design.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A boiler for vulcanizing devices comprising sides, ends, and a bottom, said sides curving to a meeting at the top of said boiler and projecting below the bottom thereof; and an electrical heating element enclosed between the projecting below portions of the sides.

2. A boiler for vulcanizing devices comprising sides, ends, and a bottom, said sides curving to a meeting at the top of said boiler and projecting below the bottom thereof; an electrical heating element enclosed between the projecting below portions of the sides; a plate extending across said latter portions and means for clamping said plate to said boiler.

3. A boiler for vulcanizing devices comprising sides, ends, and a bottom, said sides curving to a meeting at the top of said boiler and projecting below the bottom thereof; an electrical heating element enclosed between the projecting below portions of the sides; and legs secured to said latter portions and adapted to support said boiler.

4. A vulcanizing device comprising a boiler; pipes projecting outward and upward from said boiler; curing arms extending across and connecting said pipes; a yoke adjustably secured to said pipes; a saddle bar slidably mounted on said pipes between said yoke and said curing arm and means for drawing said saddle bar toward said yoke.

5. A vulcanizing device comprising a boiler; pipes projecting outward and upward from said boiler; curing arms extending across and connecting said pipes; a yoke adjustably secured to said pipes; a saddle bar slidably mounted on said pipes between said yoke and said curing arm; means for drawing said saddle bar toward said yoke; and set screws carried by said saddle and adapted to engage said pipes so as to maintain said yoke in any desired position.

6. A curing arm for vulcanizing devices comprising a pair of upstanding pipes; a curing arm connecting the upper extremities of said pipes; a yoke engaging said pipes; a saddle bar placed between said yoke and said curing arm; means for drawing said saddle toward said yoke and detachable connections in said pipes placed between said saddle and said curing arm.

7. A curing arm for vulcanizing devices comprising a pair of upstanding pipes; a curing arm connecting the upper extremities of said pipes; a yoke engaging said pipes; a saddle bar placed between said yoke and said said curing arm; means for drawing said saddle toward said yoke and detachable connections in said pipes placed between said saddle and said curing arm; said saddle having an upward projecting bar adapted to pass by said connections and engage said curing arm.

In testimony whereof, I affix my signature.

CARLETON W. CAMPBELL.